Dec. 4, 1962 R. L. LEIGH 3,067,082
METHOD OF APPLYING PLASTIC FILM
Filed Dec. 27, 1956 2 Sheets-Sheet 1

INVENTOR.
Robert L. Leigh
BY William A. Zalesak
ATTORNEY

Dec. 4, 1962  R. L. LEIGH  3,067,082
METHOD OF APPLYING PLASTIC FILM
Filed Dec. 27, 1956  2 Sheets-Sheet 2

INVENTOR.
*Robert L. Leigh*
BY
*William A. Zalesak*
ATTORNEY

United States Patent Office 3,067,082
Patented Dec. 4, 1962

3,067,082
METHOD OF APPLYING PLASTIC FILM
Robert L. Leigh, Marion, Ind., assignor to Radio Corporation of America, a corporation of Delaware
Filed Dec. 27, 1956, Ser. No. 630,979
5 Claims. (Cl. 156—84)

This invention relates to the art of applying plastic film to an article, and is herein described as embodied in a method of applying such a film from sheet material to the exterior face of a cathode ray picture tube, the film serving ultimately as a protective device, in case of tube implosion, to guard the viewer against flying glass fragments.

It has been proposed to provide television picture tubes with a guard layer formed from plastic sheet material and covering the face plate end of the tube. According to one method of applying the guard layer, a sheet of the plastic material is tautly supported on a frame parallel to the face plate of the tube, and while the sheet is subjected to heat, it is brought into intimate contact with the face plate by a vacuum draping operation. Briefly, the draping operation comprises supporting the tube on a plate provided with a cavity in which the neck of the tube is disposed, bringing the frame supporting the plastic sheet and the plate into vacuum tight engagement to form a closed chamber enveloping the tube while causing the plastic sheet to stretch over the face plate end of the tube, and exhausting air from within the chamber to cause the plastic sheet material to drape over and join to portions of the side wall of the tube by means of an intermediate adhesive cement.

A particularly desirable material for the plastic guard layer, because of its superior strength, is a polyester film made from polyethylene terephthalate—the polymer formed by the condensation reaction between ethylene glycol and terephthalic acid, and known in the trade as "Mylar" film (Du Pont trade name). In applying this or any other type of plastic film material by the aforementioned method, care must be exercised to avoid the occurrence of what is termed a "cold drape." A "cold drape" refers to a drape in which one or more areas of the side wall of the tube are not covered by the guard layer, due to insufficient stretching of the pastic. For the guard layer to be effective and free of wrinkles, all areas of the side wall should be covered by the guard layer to a distance of about three inches from the face plate.

This invention is based in part on the realization that the plastic sheet material may have a tensile strength in a given direction across its surface which differs substantially from the tensile strength in a transverse direction. In such case, the application of uniform heat over all surface areas of the plastic sheet during the vacuum forming operation may produce a complete and satisfactory drape over those side wall areas aligned in the direction of low tensile strength, but inevitably it produces a cold drape over the side wall areas aligned in the direction of high tensile strength.

Accordingly, a principal object of this invention is to provide improvements in the art of applying plastic film material to an article;

A further object of this invention is the elimination of "cold drapes" which heretofore were formed in guard layers applied to television picture tubes.

Briefly, the foregoing and other objects are achieved in accordance with this invention by applying more heat per unit area, i.e., heating to a higher temperature, to those areas of a plastic sheet aligned in the direction exhibiting high tensile strength than is applied to those areas aligned in a transverse direction and exhibiting a somewhat lower tensile strength. Accordingly, since the tensile strength is a function of temperature, the thermal gradients established in the film produce uniform tensile properties in all directions of the film and cause the film to drape uniformly over the tube.

Figure 1:
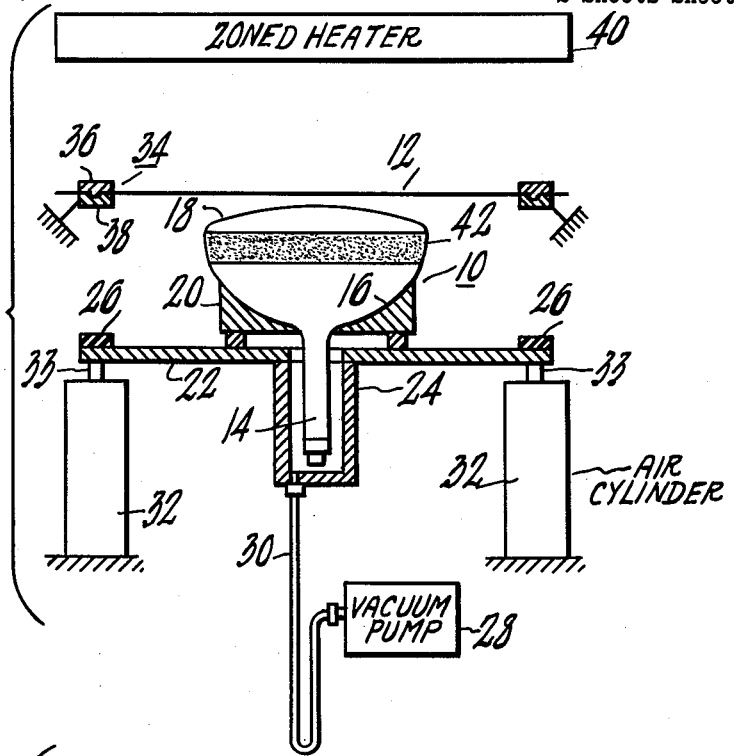
FIG. 1 is a schematic view of apparatus for applying a plastic film from sheet material to a television picture tube according to the method of the invention and illustrating an early step in the method.

In FIG. 1, a sealed and processed cathode ray or television picture tube 10 is shown in conjunction with apparatus for applying a guard layer thereto from plastic sheet material 12. The envelope of the tube 10 comprises a tubular neck portion 14, a flared or funnel portion 16 and a face plate 18, which may all be constructed of glass, as is conventional. Usually, the face plate 18 has a rectangular shape, but sometimes it is circular.

The tube 10 is mounted on a support 20 having sloping inner surfaces which engage the funnel portion 16. The support 20 in turn is mounted on a plate 22 provided with a downwardly extending hollow part 24 in the center thereof in which the neck portion 14 is disposed. The upper surface of the plate 22 is provided with a gasket 26. A vacuum pump 28 is connected to the hollow part 24 by means of a pipe 30 for a purpose to be described. The plate 22 is adapted to be moved vertically by means of air cylinders 32 including movable pistons 33.

The plastic sheet material 12 is supported above and facing the face plate 18 by means of a continuous frame 34 of larger dimensions than the face plate 18 and including complementary tongued and grooved members 36 and 38, between which the plastic sheet is clamped. The frame 34 and gasket 26 have like dimensions so that they may engage one another.

A broad area heater 40 positioned above the plastic sheet 12 is designed to heat the plastic sheet 12 in a certain manner to be described so that uniform and wrinkle free coverage of the face plate 18 and adjacent sides of the funnel 16 is achieved, and "cold drapes" are eliminated.

Figure 2:
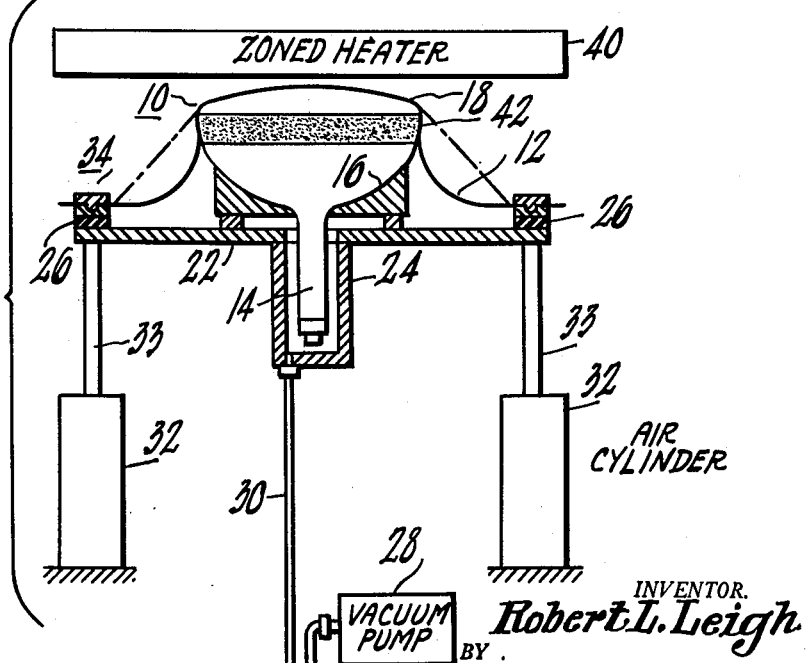
FIG. 2 is a similar schematic view of the apparatus and tube of FIG. 1, illustrating a later step of the method according to the invention.

In order to apply the guard layer on the tube 10, the tube 10 is first coated with an annular band 42 of adhesive cement at the top of the funnel portion 16, and it is then mounted on the apparatus in the position shown in FIG. 1. The heater 40 is energized, and heat therefrom radiates to the plastic sheet 12, causing it to soften to the point where molecular surface tension forces in the plastic sheet 12 cause the material to contract so as to remove substantially all wrinkles in the sheet 12. When this occurs, the air cylinders 32 are energized, whereupon the pistons 33 move the plate 22 upwardly so that the gasket 26 engages the bottom of the frame 34 and makes a vacuum seal between the frame 34 and the plate 22, as shown in FIG. 2.

During the upward movement of the plate 22, the tube face plate 18 is pushed against the plastic sheet 12, which is pulled along with the tube 10 and is stretched over the face plate 18. When the plate 22 and frame 34 are brought together, an enclosing chamber is formed around the tube 10, the chamber being constituted of the plastic sheet 12, the frame 34, the gasket 26, the plate 22, and the hollow part 24. Thus, when the vacuum pump 28 is energized to exhaust air from within the chamber, the gas pressure differential between the outside and the inside of the chamber causes the plastic sheet 12 to drape over the sides of the tube 10, as shown in FIG. 2, where it adheres to the adhesive band 42 and fits snugly over the face of the tube 10.

The heater 40 is moved to a standby position, and the vacuum pump 28 and air cylinders 32 are then de-energized to cause the plate 22 and tube 10 to retract to their former position. During the cooling of the plastic sheet 12 it may contract about the tube 10 and fix still tighter thereto. The plastic sheet 12 is then trimmed below the adhesive band 42 to leave a guard layer shaped in the form of a cap around the face plate end of the tube 10.

As mentioned previously, prior attempts to form a guard layer over a tube were not successful, due to the formation of "cold drapes." That is, in many cases, during the evacuation step, the plastic sheet 12 would not pull down over the sides of the tube 10 sufficiently to form a wide enough adherent rim to provide a guard layer which would give adequate implosion protection and which would be free of wrinkles in front of the face plate 18.

Figure 3:
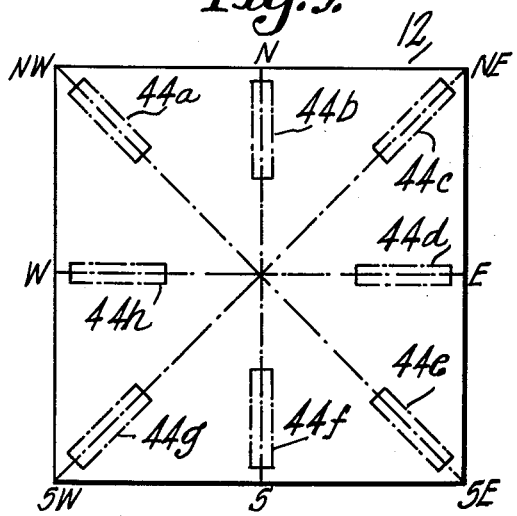
FIG. 3 is a plan view of a sheet of plastic film from which specimen strips are taken to determine tensile unbalance.

It was discovered that "cold drapes" were primarily the result of non-uniformities in the tensile properties of the plastic material. For example, tests made on square sheets of plastic cut from rolls, as shown in FIG. 3 showed a tensile unbalance along the diagonals. These tests were performed by cutting from a sheet a number of 1" x 6" strips 44($a-h$) oriented in the direction shown. These strips 44($a-h$) were then subjected to tensile testing according to the following formula:

Tensile strength (p.s.i.) at 65% elongation $$= \frac{\text{Load (lbs.) to produce 65\% elongation}}{\text{Thickness (in.)} \times \text{width (in.)}}$$

The calculations for tensile unbalance were then made, using average values of the sample strips in the directions that required the maximum and minimum loading to produce 65% elongation, according to the following formula:

Percent tensile unbalance $$= \frac{\text{Maximum load} - \text{minimum load} \times 100}{\text{Minimum load}}$$

The tensile unbalance has been found to vary between 35% and 100% in typical lots of material with the maximum and minimum tensile strengths generally on the diagonals of a square sheet. Stated in other words, referring to FIG. 3, it has been found that the tensile strength of strips 44$d$, 44$h$ aligned in the east-west direction is substantially equal to that of strips 44$b$, 44$f$ aligned in the north-south direction, and hence no appreciable tensile unbalance exists with respect to those directions. However, with respect to strips 44$a$, 44$e$ aligned in the northwest-southwest direction, the strips 44$c$, 44$g$ aligned in the northeast-southwest direction may show 35% to 100% greater tensile strength.

It occurs that when a sheet of such film material is applied by the vacuum drape method described, unless special precautions are taken with respect to the heating of the film, "cold drapes" and wrinkles are likely to result. This is due to the fact that under stress, the film material does not yield as much along the direction of high tensile strength as it does along the direction of lower tensile strength. Hence, in the areas of less yield, the film does not drape over the sides of the tube.

Figure 4:
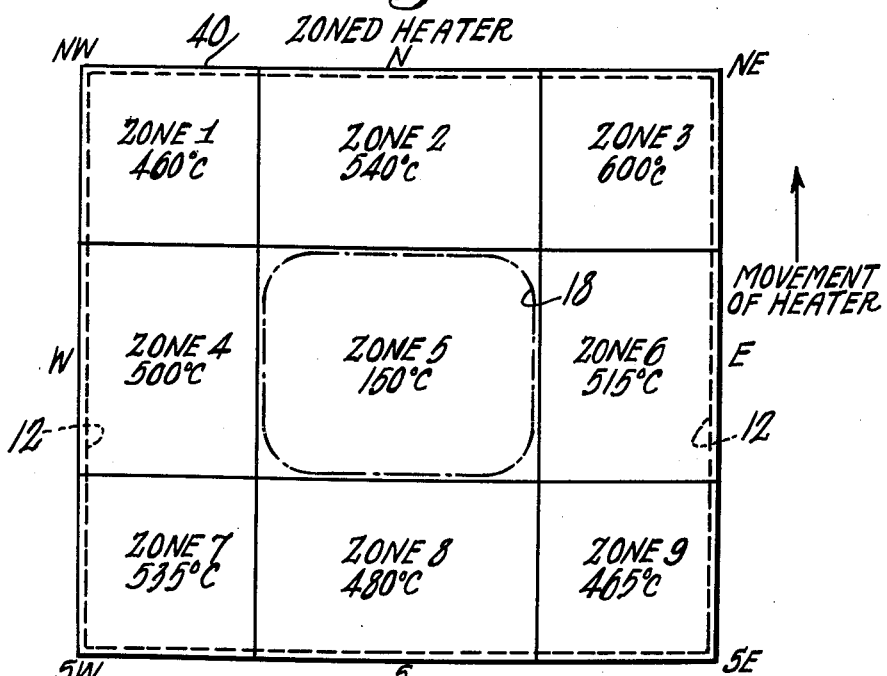
FIG. 4 is a schematic view showing a heater divided into zones for applying a non-uniform heat pattern in the plastic film according to the invention.

In accordance with the invention, a pattern of heat is applied to a film showing tensile unbalance, in such a way as to impart more uniform tensile properties to the film. The heat pattern is such that areas of the film which are desired to be stretched and which are aligned in the direction of high tensile strength are made proportionally hotter than such areas aligned in the direction of lower tensile strength. This is achieved by dividing the heater 40 into a number of heat zones, for example, nine, as shown diagrammatically in FIG. 4. The plastic sheet 12 oriented in the fashion shown in FIG. 3 is shown positioned under the heater 40, so that the heat zones may be visualized as radiating heat in the direction into the paper.

In the example, shown, a .0075" thick Mylar film which had a 35% tensile unbalance (high tensile strength in the SW-NE direction) was heat treated in accordance with the invention, and the zone temperatures listed below and shown in the drawing gave satisfactory forming results.

| Zone: | Temperature, °C. |
| --- | --- |
| 1 | 460 |
| 2 | 540 |
| 3 | 600 |
| 4 | 500 |
| 5 | 150 |
| 6 | 515 |
| 7 | 535 |
| 8 | 480 |
| 9 | 465 |

The temperatures specified were taken at the heater 40, inasmuch as no accurate measurement could be taken on the film 12. The heater 40 was set at a distance of 9½ inches above the film 12.

It will be observed that peripheral zones 7 and 3, which are aligned SW-NE in the direction of high tensile strength are hotter than peripheral zones 1 and 9, which are aligned NW-SE in the direction of lower tensile strength.

It will also be observed that zone 5 in the central portion of the heater is at a much lower temperature, for example, 150° C. This is done so that the greater portion of the plastic film which is ultimately applied to the face plate of the tube undergoes little or no stretching and consequently no appreciable reduction in protective film thickness. It is primarily the outer or peripheral surface areas of the film which must be uniformly stretched, for it is those areas which are mainly affected by the draping operation. Thus, it will be seen that, of the areas which it is desired to stretch, i.e., the peripheral areas, greatest heat per unit area, i.e., the highest temperature is applied to those areas aligned in the SW-NE direction.

In the apparatus used, the heater 40 is initially moved over the film 12 in the north direction to position it directly over the film 12, is held there for several seconds, and then is moved south away from the film 12. Under these conditions, the southern areas of the film 12 are heated a longer period of time during each cycle than the northern areas. Consequently, the temperatures of zones 7, 8, and 9 are maintained somewhat lower than would be the case if all areas of the film 12 received heat for an equal period of time, for example, if the heater 40 were lowered and raised into and out of position rather than moved laterally.

With the heating arrangement shown, the total heating time may be varied from 13 seconds to 23 seconds with no apparent change in drape quality. However, when the temperatures of all nine zones are equally maintained at 500° C., a satisfactory drape at any heating interval is extremely difficult and so critical that the process becomes impractical for commercial use.

By means of the invention, therefore, a plastic film may be applied to an article from sheet material in such a way as to avoid the former defects. When used to provide a guard layer on a cathode ray tube, the method produces a guard layer which is free of cold drapes, thus assuring a wrinkle-free film which is more positively attached to the tube.

What is claimed is:

1. The method of applying to a faceplate of a cathode ray tube a sheet of plastic material having a greater tensile strength in a given direction across its surface than in a direction transverse to said given direction, said method comprising determining the direction of highest tensile strength of said sheet, applying said sheet to said faceplate, simultaneously heating said sheet to higher temperature in areas which are desired to be stretched and which are aligned in the direction of greater tensile strength than in areas aligned in such said transverse direction, and forming a taut covering of said sheet on said faceplate.

2. The method of applying a plastic film to an article from plastic sheet material which has a substantial unbalance of tensile strengths with respect to two intersecting directions across the surface of the material and which decreases in tensile strength when heated, said method comprising applying a sheet of said material to said article, subjecting said sheet to greater heat per unit area in areas of the sheet aligned across said article in the direction of high tensile strength and thus making them hotter than the areas aligned across said article in the intersecting direction, and stretching said sheet over said article to form a tightly fitting cap therefor.

3. The method of applying a plastic cap to a bulbous article from a sheet of plastic film which has a given tensile strength in one surface direction and a lower tensile strength in a surface direction perpendicular to said given direction and which experiences a decrease in tensile strength when heated, said method comprising positioning said sheet adjacent to said article, applying a nonuniform surface pattern of heat to said sheet to make some areas hotter than others to more nearly equalize the tensile strength properties in both of said directions, bringing said sheet and article together, and vacuum draping said sheet over a portion of said article to form a tightly fitting cap thereover.

4. The method of applying over the faceplate of a cathode ray tube a sheet of plastic material exhibiting an unbalance of tensile strengths in at least two mutually transverse directions across the surface thereof, said method comprising supporting said sheet at its peripheral edge surfaces, applying heat to said sheet in a nonuniform surface pattern in which the temperatures of peripheral areas aligned across said faceplate along two different directions is proportional respectively to the tensile strengths along the same two directions, forcing said faceplate against said sheet whereby to partially cover said faceplate, and collapsing the portions of said sheet not engaged by said faceplate to further cover said faceplate with said sheet.

5. The method of applying a plastic film to a cathode ray tube having a faceplate from a sheet of film material which exhibits unequal tensile strengths in at least two mutually transverse directions across the surface of said sheet and which experiences a decrease of tensile strength when heated, said method comprising supporting said sheet at its peripheral edge surfaces, determining the direction of highest tensile strength of said sheet, positioning said sheet opposite said faceplate, heating said sheet to temperatures proportionately greater in peripheral zones aligned in a line lying substantially across the center of said faceplate in the direction of higher tensile strength than in peripheral zones aligned across said faceplate in the direction of lower tensile strength, forcing said sheet against said faceplate to partially cover the same, and establishing a pressure differential between the two sides of said sheet so as to cause non-engaging portions of said sheet to uniformly drape over said cathode ray tube.

References Cited in the file of this patent

UNITED STATES PATENTS

| | | |
|---|---|---|
| 2,531,540 | Smith | Nov. 28, 1950 |
| 2,690,593 | Abercrombie | Oct. 5, 1954 |
| 2,731,654 | Nowak | Jan. 24, 1956 |
| 2,749,572 | Nowak | June 12, 1956 |
| 2,828,799 | Harrison | Apr. 1, 1958 |